(12) United States Patent
Minemoto et al.

(10) Patent No.: US 11,989,011 B2
(45) Date of Patent: *May 21, 2024

(54) DISPLAY SYSTEM, DISPLAY METHOD, AND NON-TRANSITORY COMPUTER-READABLE RECORDING MEDIUM RECORDING DISPLAY PROGRAM FOR CHECKING CAUSE OF ABNORMALITY

(71) Applicant: OMRON Corporation, Kyoto (JP)

(72) Inventors: Toshifumi Minemoto, Kyoto (JP); Reiko Hattori, Kyoto (JP); Yuya Ota, Kyotanabe (JP); Shinsuke Kawanoue, Kyoto (JP); Akira Nakajima, Otsu (JP)

(73) Assignee: OMRON Corporation, Kyoto (JP)

( * ) Notice: Subject to any disclaimer, the term of this patent is extended or adjusted under 35 U.S.C. 154(b) by 530 days.

This patent is subject to a terminal disclaimer.

(21) Appl. No.: 17/269,535

(22) PCT Filed: Feb. 3, 2020

(86) PCT No.: PCT/JP2020/003870
§ 371 (c)(1),
(2) Date: Feb. 19, 2021

(87) PCT Pub. No.: WO2020/183975
PCT Pub. Date: Sep. 17, 2020

(65) Prior Publication Data
US 2021/0200194 A1 Jul. 1, 2021

(30) Foreign Application Priority Data
Mar. 13, 2019 (JP) .................................. 2019-045646

(51) Int. Cl.
G05B 19/418 (2006.01)
G05B 23/02 (2006.01)

(52) U.S. Cl.
CPC ... *G05B 19/41875* (2013.01); *G05B 19/4183* (2013.01); *G05B 23/0221* (2013.01); *G05B 2219/32368* (2013.01)

(58) Field of Classification Search
CPC .......... G05B 19/41875; G05B 19/4183; G05B 23/0221; G05B 2219/32368
(Continued)

(56) References Cited

U.S. PATENT DOCUMENTS 8,676,553 B2 3/2014 Miwa et al.
2008/0276137 A1* 11/2008 Lin .................... G05B 23/0267
714/57
(Continued)

FOREIGN PATENT DOCUMENTS

CN 101414186 4/2009
CN 102713777 10/2012
(Continued)

OTHER PUBLICATIONS

"Office Action of Japan Counterpart Application" with English translation thereof, dated Aug. 23, 2022, p. 1-p. 8.
(Continued)

*Primary Examiner* — Jigneshkumar C Patel
(74) *Attorney, Agent, or Firm* — JCIPRNET

(57) ABSTRACT

A display system provided in production equipment having driving means and monitoring means with controllable features includes a control unit, a display unit, and a storage unit. The control unit obtains a feature output over time from at least one among the driving means and the monitoring means, and causes the storage unit to store the feature; constructs, in each prescribed time, a causal relationship model that indicates a causal factor selected from among the driving means and the monitoring means for at least one abnormality that can occur in the production equipment and
(Continued)

that also indicates the relationship between causal factors on the basis of the obtained feature; and displays, on the display unit, a plurality of causal relationship models constructed in a plurality of times.

6 Claims, 13 Drawing Sheets

(58) Field of Classification Search
USPC .......................................................... 700/109
See application file for complete search history.

(56) References Cited

U.S. PATENT DOCUMENTS

| | | | | |
|---|---|---|---|---|
| 2011/0264424 | A1* | 10/2011 | Miwa | G05B 23/0283 703/2 |
| 2015/0169393 | A1* | 6/2015 | Shibuya | G05B 23/0243 702/182 |
| 2018/0203439 | A1 | 7/2018 | Hattori et al. | |
| 2020/0041988 | A1 | 2/2020 | Natsumeda | |

FOREIGN PATENT DOCUMENTS

| | | |
|---|---|---|
| JP | 2003162504 | 6/2003 |
| JP | 2005141292 | 6/2005 |
| JP | 2006330878 | 12/2006 |
| JP | 200803920 | 1/2008 |
| JP | 2010277199 | 12/2010 |
| JP | 2015172945 | 10/2015 |
| JP | 2017111657 | 6/2017 |
| JP | 2018073316 | 5/2018 |
| JP | 2018116545 | 7/2018 |
| JP | 2018173332 | 11/2018 |
| JP | 2018181021 | 11/2018 |
| JP | 2018200556 | 12/2018 |
| JP | 2018206362 | 12/2018 |
| WO | 2018073960 | 4/2018 |

OTHER PUBLICATIONS

"International Search Report (Form PCT/ISA/210)"of PCT/JP2020/ 003870, dated Mar. 24, 2020, with English translation thereof, pp. 1-4.
"Written Opinion of the International Searching Authority (Form PCT/ISA/237)" of PCT/JP2020/003870, dated Mar. 24, 2020, with English translation thereof, pp. 1-8.
"Search Report of Europe Counterpart Application", dated Nov. 3, 2022, pp. 1-9.
"Office Action of Europe Counterpart Application", dated Oct. 12, 2023, p. 1-p. 7.
"Office Action of China Counterpart Application No. 202080004364. 0", issued on Mar. 21, 2024, with English translation thereof, p. 1-p. 24.

* cited by examiner

Average torque

Time T1

Time T2

DISPLAY SYSTEM, DISPLAY METHOD, AND NON-TRANSITORY COMPUTER-READABLE RECORDING MEDIUM RECORDING DISPLAY PROGRAM FOR CHECKING CAUSE OF ABNORMALITY

CROSS-REFERENCE TO RELATED APPLICATION

This application is a 371 application of the International PCT application serial no. PCT/JP2020/003870, filed on Feb. 3, 2020, which claims the priority benefits of Japan Patent Application No. 2019-045646, filed on Mar. 13, 2019. The entirety of each of the above-mentioned patent applications is hereby incorporated by reference herein and made a part of this specification.

BACKGROUND

Technical Field

The present invention relates to a display system, a display method, and a non-transitory computer-readable recording medium recording a display program.

Description of Related Art

As a method for monitoring a state of equipment, Patent Document 1 has proposed a method in which modes are divided for each operation state based on an event signal, a normal model is created for each mode, and an abnormality is determined based on the created normal model. In this method, a false alarm in which normality is incorrectly determined as an abnormality is prevented from occurring by checking the sufficiency of learning data used to create the normal model and setting a threshold value to be used for determination of an abnormality based on the result of the checking.

In addition, Patent Document 2 has proposed a method for detecting the occurrence of an abnormality of a product produced by production equipment. Specifically, Patent Document 2 has proposed a method in which data collected from a production system is classified for a normal product case and an abnormal product case, a feature at which a significant difference is made between the normal product case and the abnormal product case is identified, and whether a product is normal is diagnosed based on the identified feature.

RELATED ART

Patent Document

[Patent Document 1] Japanese Patent Laid-Open No. 2015-172945
[Patent Document 2] Japanese Patent Laid-Open No. 2010-277199

SUMMARY

Technical Problem

However, even though an abnormality should be instantly resolved when it occurs in production equipment, a user generally examines a manual, or the like for the cause of the abnormality that has occurred, and then performs processing to resolve the abnormality. However, it takes time to examine the manual each time an abnormality occurs, which may delay processing. The present invention has been conceived to solve the above-described problem, and provides a display system, a display method, and a display program that enable the cause of an abnormality that may occur in production equipment to be easily checked.

Solution to the Problem

A display system according to the present invention is a display system provided in production equipment that produces a product, and has at least one driving means for driving the production equipment and at least one monitoring means for monitoring the production, in which the driving means and the monitoring means have at least one controllable feature, the display system including a control unit, a display unit, and a storage unit, in which the control unit obtains the feature output over time from at least one among the driving means and the monitoring means and causes the storage unit to store the feature, constructs, at each prescribed time, a causal relationship model that indicates at least one causal factor that is selected from the driving means and the monitoring means for at least one abnormality that can occur in the production equipment and a relationship between the causal factors based on the obtained feature, and displays, on the display unit, a plurality of the causal relationship models constructed at a plurality of the times.

According to this configuration, causal relationship models that indicate a causal factor of at least one abnormality that can occur in production equipment and a relationship between the causal factors are constructed at a plurality of times and displayed. Thus, the causal relationship models constructed at the plurality of times can be compared. Accordingly, when there is a change in the causal relationship models at the plurality of times, for example, it is possible to know what kind of change has been made over time in a causal factor of an abnormality, and thus the cause of the abnormality can be easily identified by checking a difference between the causal relationship models.

In the display system, the control unit highlights a difference between the plurality of causal relationship models and displays the difference on the display unit.

Thus, a user can visually recognize the difference between the plurality of causal relationship models with ease.

In the display system, the control unit can display, on the display unit, a change over time in a feature of the causal factor in each of the causal relationship models.

According to this configuration, because the change over time in the feature of the causal factor in the causal relationship model can be checked, when there is a change in the plurality of causal relationship models, for example, the cause of the change can be examined by checking the change over time in the feature. Thus, the cause of the abnormality can be easily identified.

The display system further includes a notification unit that gives a notification when there is a difference between the plurality of causal relationship models constructed at the plurality of times.

According to this configuration, the change that has occurred in the plurality of causal relationship models is notified of by the notification unit, and thus a user can forecast occurrence of an abnormality.

A display method according to the present invention is a display method for displaying, on a display unit, a causal relationship of an abnormality that can occur in production equipment that produces a product, and has at least one driving means for driving the production equipment and at least one monitoring means for monitoring the production, the display method including: obtaining the feature output over time from at least one among the driving means and the monitoring means; constructing, at each prescribed time, a causal relationship model that indicates at least one causal factor that is selected from the driving means and the monitoring means for at least one abnormality that can occur in the production equipment and a relationship between the causal factors based on the obtained feature; and displaying, on the display unit, a plurality of the causal relationship models constructed at a plurality of the times.

A non-transitory computer-readable recording medium recording a display program according to the present invention records a display program for displaying, on a display unit, a causal relationship of an abnormality that can occur in production equipment that produces a product, and has at least one driving means for driving the production equipment and at least one monitoring means for monitoring the production, the display program causing a computer to execute: obtaining the feature output over time from at least one among the driving means and the monitoring means; constructing, at each prescribed time, a causal relationship model that indicates at least one causal factor that is selected from the driving means and the monitoring means for at least one abnormality that can occur in the production equipment and a relationship between the causal factors based on the obtained feature; and displaying, on the display unit, a plurality of the causal relationship models constructed at a plurality of the times.

Effects

According to the present invention, the cause of an abnormality that can occur in production equipment can be easily checked.

DESCRIPTION OF THE EMBODIMENTS

An embodiment according to an aspect of the present invention (which will also be referred to as "the present embodiment") will be described based on the drawings. However, the present embodiment which will be described below is merely an example of the present invention in every respect. It is a matter of course that various improvements and modifications can be performed without departing from the scope of the present invention. In other words, a specific configuration according to the embodiment may be appropriately employed to implement the present invention. Further, although data appearing in the present embodiment is described using a natural language, and more specifically, specified in a pseudo language, a command, a parameter, a machine language, and the like that can be recognized by a computer.

1. Application Example

Figure 1:
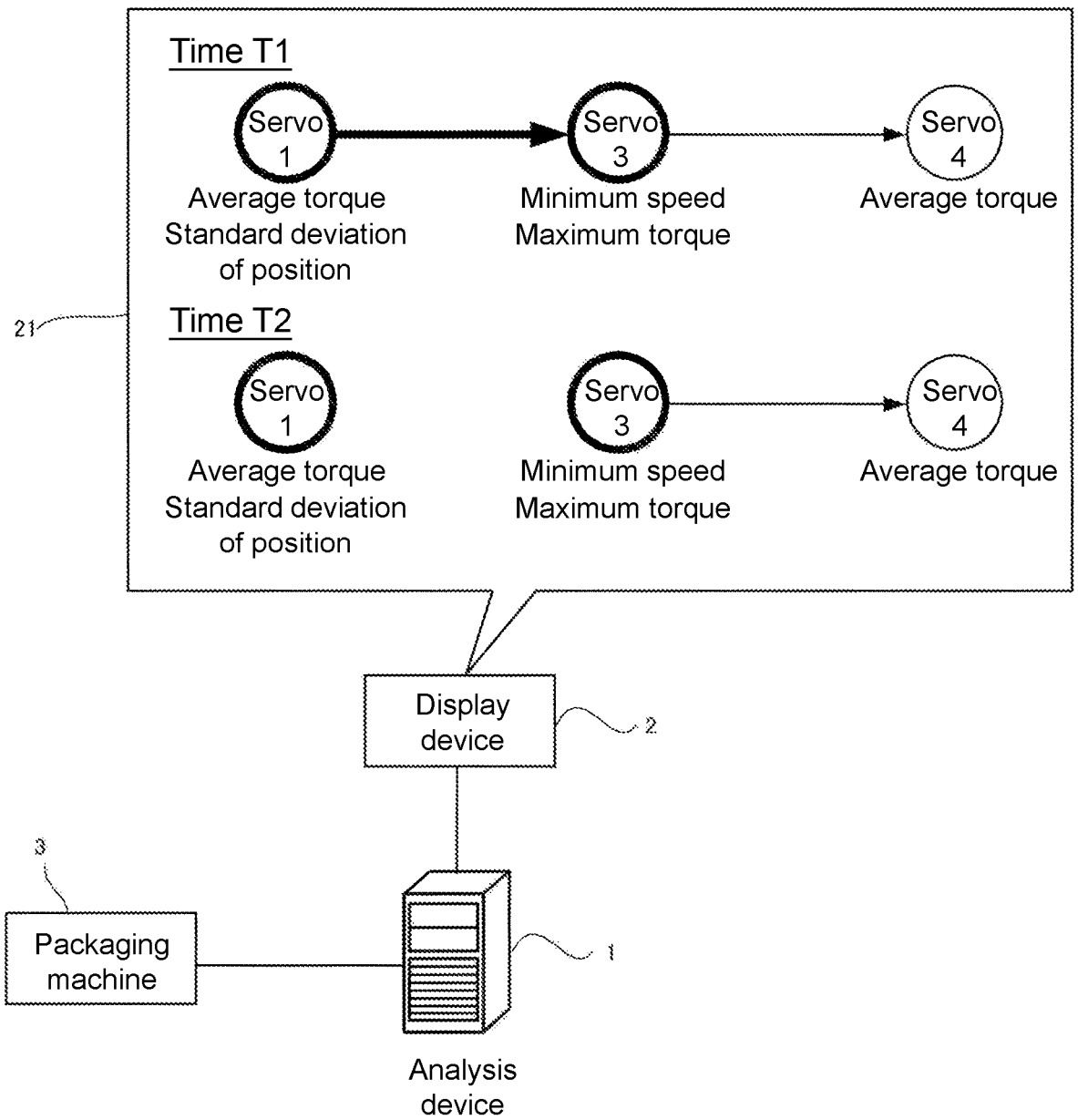
FIG. 1 schematically illustrates an example of a situation to which the present invention is applied.

First, an example of a situation to which the present invention is applied will be described with reference to FIG. 1. FIG. 1 schematically illustrates an example of a situation to which a production system according to the present embodiment is applied. The production system according to the present embodiment includes a packaging machine 3 that is an example of production equipment, an analysis device 1, and a display device 2. The analysis device 1 is a computer configured to derive and display a causal relationship between a servo motor (driving means) provided in the packaging machine 3 and various sensors (monitoring means). Further, the driving means such as the servo motor and the monitoring means such as the various sensors will be collectively referred to as mechanisms below. In addition, a causal factor according to the present invention corresponds to a mechanism among the mechanisms which causes the occurrence of an abnormality.

The analysis device 1 generates a causal relationship model for the mechanisms with respect to an abnormality that can occur in the packaging machine 3 and displays the causal relationship model on a screen 21 of the display device 2. The example of FIG. 1 illustrates a causal relationship model when abnormal wear of a leather belt for the brake of a film roll 30 (see FIG. 3), which will be described below, takes place at two times including a time T1 and a time T2. In other words, servos 1, 3, and 4 among a plurality of servo motors provided in the packaging machine 3 are displayed as nodes, and the servos are linked by edges. In addition, an orientation of an edge indicates a causal relationship. That is, the edges indicate that, when wear of a leather belt takes place, the servo 1 affects the servo 3, further the servo 3 affects the servo 4, and as a result, wear of the leather belt takes place. Thus, an operator of the packaging machine 3 is only required to check the servo 4, 3, and 1 in this order for the cause of an abnormality. However, although details will be described below, each of the servo motors has a plurality of controllable features such as torque, location, and the like, and any of the features of the servo motors establishes the causal relationship.

With the display by the screen 21, an operator can see a difference between two causal relationship models, and thus it is possible to visually recognize the mechanism to be checked to return the abnormality to normality at the current time with ease.

Further, although the packaging machine 3 is shown as an example of production equipment in the above description, a type of equipment is not particularly limited as long as it can produce any product. A type of each mechanism may not be particularly limited, and may be appropriately selected depending on an embodiment. Each mechanism may be, for example, a conveyor, a robot arm, a servo motor, a cylinder (molding machine, or the like), a suction pad, a cutting device, a sealing device, or the like. In addition, each mechanism may be a complex device, for example, a printing machine, a mounting machine, a reflow furnace, a substrate inspection device, and the like, in addition to the above-described packaging machine 3. Furthermore, each mechanism may include, for example, in addition to a device involved with any physical operation described above, a device that detects any information using various sensors, a device that acquires data from various sensors, a device that detects any information from acquired data, and a device that performs internal processing such as a device that processes acquired data for information. One mechanism may be constituted by one or a plurality of devices, or configured as a part of a device. One device may be constituted by a plurality of mechanisms. In addition, in a case in which the same device executes a plurality of processes, each part thereof may be regarded as a separate mechanism. When the same device executes a first process and a second process, for example, the device that executes the first process may be regarded as a first mechanism, and the device that executes the second process may be regarded as a second mechanism.

2. Configuration Example

<2-1. Hardware Configuration>

Figure 2:
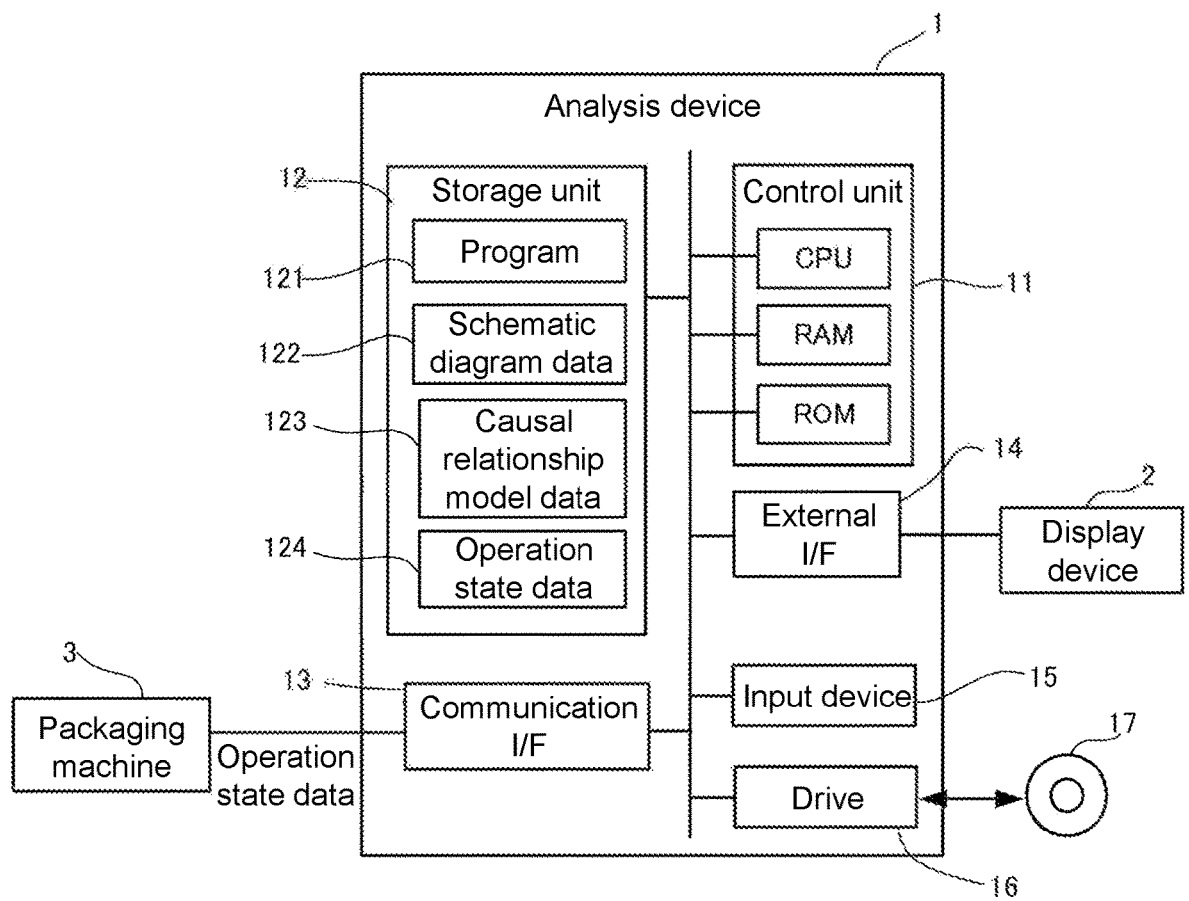
FIG. 2 is a block diagram illustrating a hardware configuration of an analysis device according to an embodiment of the present invention.
Figure 3:
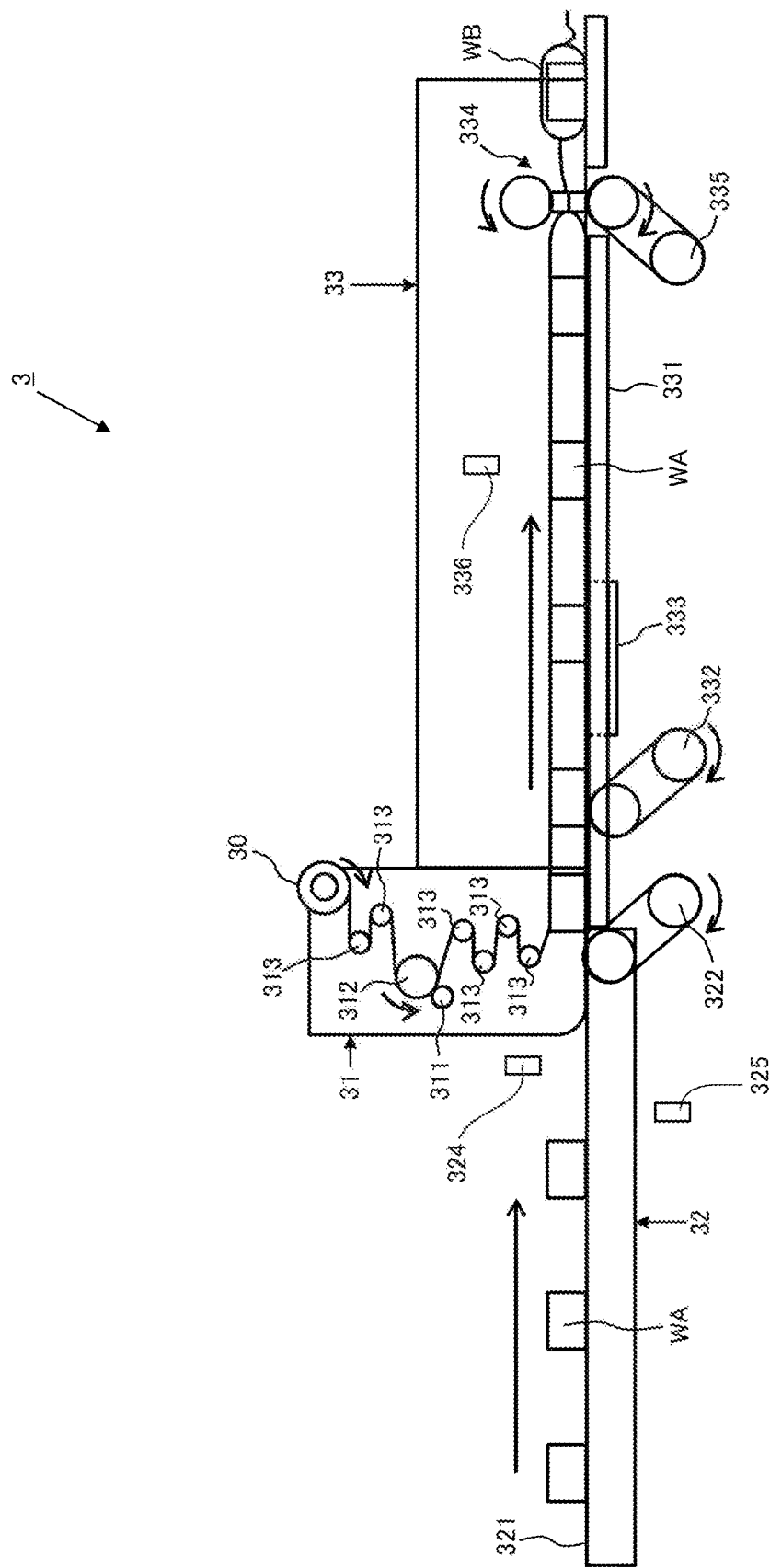
FIG. 3 is a schematic diagram of production equipment according to an embodiment of the present invention.

Next, an example of a hardware configuration of a production system according to the present embodiment will be described. FIG. 2 is a block diagram illustrating an example of a hardware configuration of the analysis device 1 according to the present embodiment, and FIG. 3 is a diagram illustrating a schematic configuration of the packaging machine.

<2-1-1. Analysis Device>

First, the example of the hardware configuration of the analysis device 1 according to the present embodiment will be described using FIG. 2. The analysis device 1 is a computer in which a control unit 11, a storage unit 12, a communication interface 13, an external interface 14, an input device 15, and a drive 16 are electrically connected as illustrated in FIG. 2.

The control unit 11 includes a central processing unit (CPU), a random access memory (RAM), a read only memory (ROM), and the like and controls each of constituent elements in accordance with information processing. The storage unit 12 is an auxiliary storage device, for example, a hard disk drive, a solid state drive, or the like, and stores a program 121 executed by the control unit 11, schematic diagram data 122, causal relationship model data 123, operation state data 124, and the like.

The program 121 is a program for generating a causal relationship model for a mechanism with respect to an abnormality occurring in the packaging machine 3, displaying the causal relationship model on the display device 2, and the like. The schematic diagram data 122 is data showing a schematic diagram of target production equipment, and data showing a schematic diagram of the packaging machine 3 in the present embodiment. The schematic diagram may be a schematic diagram of the whole packaging machine that helps at least the position of a mechanism indicated in the causal relationship model to be recognized, and may not be necessarily a detailed diagram. In addition, an enlarged diagram illustrating only a part of the packaging machine 3 may be employed.

The causal relationship model data 123 is data indicating a causal relationship model for the occurrence of an abnormality constructed with a feature of each of the mechanisms extracted from the packaging machine 3. That is, it is data indicating a causal relationship between mechanisms when an abnormality occurs. Although the causal relationship model data is generated with features extracted from the packaging machine 3, and the like in the analysis device 1 as will be described below, causal relationship model data generated in advance by an external device may be stored.

The operation state data 124 is data indicating an operation state of the packaging machine 3. Although details thereof will be described below, data that can be generated in driving of each of the mechanisms described below, for example, measurement data, for example, torque, speed, acceleration, temperature, pressure, and the like can be employed. In addition, in a case in which a mechanism is a sensor, a detection result may be, for example, detection data indicating whether there is content WA by "ON" or "OFF".

The communication interface 13 is an interface, for example, a wired local area network (LAN) module, a wireless LAN module, or the like for performing wired or wireless communication. That is, the communication interface 13 is an example of a communication unit configured to perform communication with another device. The analysis device 1 according to the present embodiment is connected to the packaging machine 3 via the communication interface 13.

The external interface 14 is an interface for connecting to an external device and is appropriately configured in accordance with an external device to be connected. In the present embodiment, the external interface 14 is connected to the display device 2. Further, a known liquid crystal display, touch panel display, or the like may be used for the display device 2.

The input device 15 is a device for input, for example, a mouse, a keyboard, and the like.

The drive 16 is, for example, a compact disk (CD) drive, a digital versatile disk (DVD) drive, or the like, and is a device for reading a program stored in a storage medium 17. A type of the drive 16 may be appropriately selected in accordance with the type of storage medium 17. Further, at least some of the various kinds of data 122 to 124 including the program 121 stored in the storage unit may be stored in the storage medium 17.

The storage medium 17 is a medium in which information such as a recorded program is accumulated by an electrical, magnetic, optical, mechanical, or chemical action so that a computer, other devices, machines, or the like can read the information such as the program. As an example of the storage medium 17, a disc-type storage medium such as a CD or a DVD is illustrated in FIG. 2. However, a type of the storage medium 17 is not limited to a disc type, and may be a type other than the disc type. An example of a storage medium of a type other than the disc type may include a semiconductor memory, for example, a flash memory, or the like.

Further, regarding the specific hardware configuration of the analysis device 1, constituent components can be omitted, replaced, and added as appropriate in accordance with an embodiment. For example, the control unit 11 may include a plurality of processors. The analysis device 1 may be constituted by a plurality of information processing devices. In addition, for the analysis device 1, a generic server device, or the like may be used in addition to an information processing device designed exclusively for a service to be provided.

<2-1-2. Packaging Machine>

Next, an example of a hardware configuration of the packaging machine 3 according to the present embodiment will be described using FIG. 3. FIG. 3 schematically illustrates an example of a hardware configuration of the packaging machine 3 according to the present embodiment. The packaging machine 3 is a so-called horizontal pillow packaging machine which is a device for packaging content WA such as food (dried noodles, etc.) or stationery (erasers, etc.). However, the type of content WA can be appropriately selected in accordance with an embodiment and is not particularly limited. The packaging machine 3 includes a film roll 30 on which a packaging film is wound, a film transport part 31 that transports the packaging film, a content transport part 32 that transports content WA, and a packing part 33 that packages content with the packaging film.

The packaging film may be a resin film, for example, a polyethylene film, or the like. The film roll 30 has a winding core, and the packaging film is wound around the winding core. The winding core is supported to be rotatable around the axis, and thus the film roll 30 is configured to unwind the packaging film while rotating.

The film transport part 31 includes a drive roller driven by a servo motor (servo 1) 311, a passive roller 312 to which a rotation force is applied from the drive roller, and a plurality of pulleys 313 that guides the packaging film while applying tension thereto. With this configuration, the film transport part 31 unwinds the packaging film from the film roll 30 and transports the unwound packaging film to the packing part 33 without loosening.

The content transport part 32 includes a conveyor 321 that transports the content WA to be packaged and a servo motor (servo 2) 322 that drives the conveyor 321. The content transport part 32 is connected to the packing part 33 through the lower part of the film transport part 31 as illustrated in FIG. 3. Accordingly, the content WA transported by the content transport part 32 is supplied to the packing part 33 and packaged with the packaging film supplied from the film transport part 31. In addition, regarding downstream information of the conveyor 321, a fiber sensor (sensor 1) 324 that detects a position of the content WA is provided. Furthermore, another fiber sensor (sensor 2) 325 that detects the placement of the content WA is provided below the conveyor 321. These sensors 1 and 2 detect whether the content WA is being transported at a correct position to be correctly packaged.

The packing part 33 includes a conveyor 331, a servo motor (servo 3) 332 that drives the conveyor 331, a center sealing part 333 that seals the packaging film in the transport direction, and an end sealing part 334 that cuts the packaging film at both ends in the transport direction and seals it at each end.

The conveyor 331 transports the content WA transported from the content transport part 32 and the packaging film supplied from the film transport part 31. The packaging film supplied from the film transport part 31 is supplied to the center sealing part 333 while being appropriately folded such that both side edges in the width direction overlap. The center sealing part 333 is constituted by, for example, a pair of left and right heating rollers (heaters 1 and 2) and seals the both folded side edges of the packaging film in the transport direction by heating. Accordingly, the packaging film is formed in a tubular shape. The content WA is input to the packaging film formed in the tubular shape. In addition, a fiber sensor (sensor 3) 336 that detects a position of the content WA is provided above the conveyor 331 on the upstream side of the end sealing part 334.

Meanwhile, the end sealing part 334 has, for example, a roller that is driven by a servo motor 335, a pair of cutters that open and close in accordance with rotation of the roller, and heaters (heaters 3) provided at both sides of each of the cutters. Accordingly, the end sealing part 334 is configured to cut the tubular packaging film in a direction orthogonal to the transport direction and seal the cut portion by heating. While the tubularly formed packaging film passes through the end sealing part 334, the tip portion of the packaging film is sealed at both sides in the transport direction and then separated from the succeeding one, and thereby a package WB containing the content WA is produced.

<2-1-3. Packaging Step>

The above-described packaging machine 3 can package the content WA in the following steps. That is, the film transport part 31 unwinds a packaging film from the film roll 30. In addition, the content transport part 32 transports the content WA to be packaged. Next, the center sealing part 333 of the packing part 33 forms the packaging film that has been paid out in a tubular shape. Then, after inputting the content WA into the tubular-shaped packaging film, the end sealing part 334 cuts the tubular packaging film in the direction orthogonal to the transport direction and seals the both sides of the cut portion in the transport direction by heating. Accordingly, the horizontal pillow-shaped package WB containing the content WA is formed. That is, packaging of the content WA is completed.

Further, driving control of the packaging machine 3 can be performed by a PLC, or the like provided separately from the packaging machine 3. In this case, the above-described operation state data 124 can be acquired from the PLC. In addition, ten mechanisms to construct a causal relationship for abnormalities are set in the packaging machine 3 configured as described above, as an example. That is, the above-described servos 1 to 4, heaters 1 to 3, and sensors 1 to 3 are set as mechanisms, and a causal relationship between these mechanisms when an abnormality occurs is constructed as a causal relationship model. Details thereof will be described below.

<2-2. Functional Configuration>

Figure 4:
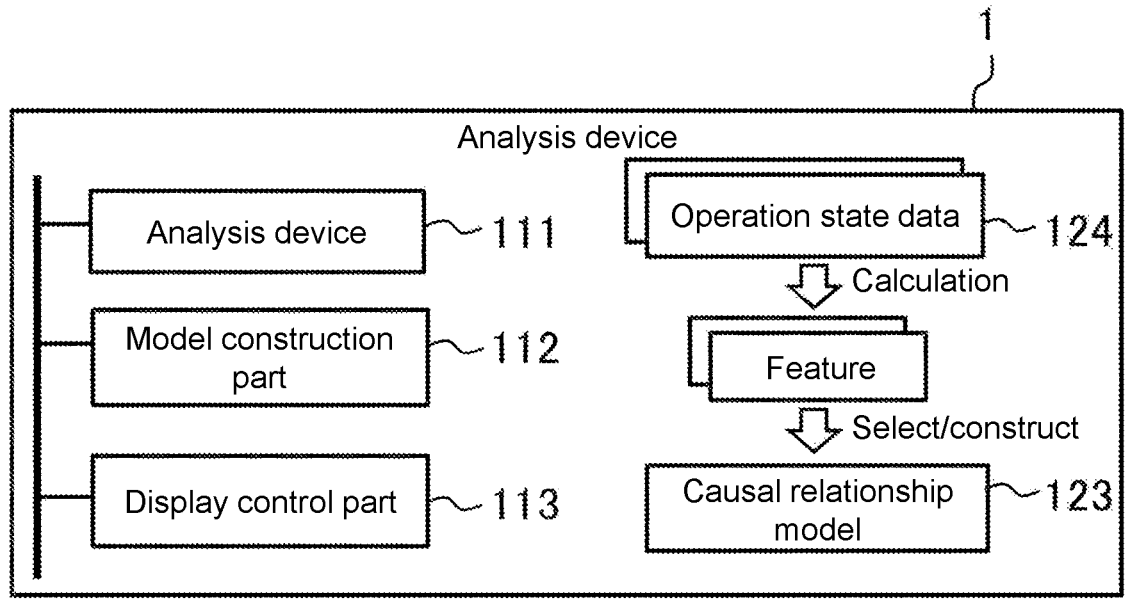
FIG. 4 is a block diagram illustrating a functional configuration of the analysis device.

Next, a functional configuration (software configuration) of the analysis device 1 will be described. FIG. 4 illustrates an example of a functional configuration of the analysis device 1 according to the present embodiment. The control unit 11 of the analysis device 1 loads a program 8 stored in the storage unit 12 in the RAM. Then, the control unit 11 interprets and executes the program 8 loaded in the RAM using the CPU to control each constituent elements. With this configuration, the analysis device 1 according to the present embodiment functions as a computer including a feature acquisition part 111, a model construction part 112, and a display control part 113, as illustrated in FIG. 4.

The feature acquisition part 111 acquires values of a plurality of types of features calculated from the operation state data 124 indicating an operation state of the packaging machine 3 for each of a time of normality in which the packaging machine 3 forms the package WB normally and a time of abnormality in which an abnormality occurs in the formed package WB. The model construction part 112 selects an effective feature for predicting an abnormality from the plurality of acquired types of features based on a prescribed algorithm with which a degree of relationship between each type of feature and an abnormality that occurs in the formed package WB is derived from the value of the type of feature for each of the acquired times of normality and abnormality. Then, the causal relationship model 123 indicating a causal relationship between the mechanisms when a abnormality occurs is constructed using the selected feature.

The display control part 113 has a function of displaying a schematic diagram of the packaging machine 3 described above, the causal relationship model, various features, and the like on the screen 21 of the display device 2. In addition, the display control part 113 controls display of various kinds of information on the screen 21 of the display device 2.

Each function of the analysis device 1 will be described in an operation example to be described below in detail. Further, in the present embodiment, an example in which all of the above-described functions are realized by the generic CPU has been described. However, some or all of the above-described functions may be realized by one or a plurality of dedicated processors. In addition, the functional configuration of the analysis device 1 may be appropriately subject to an omission, a replacement, and an addition of a function in accordance with an embodiment.

3. Operation Example

Next, an operation example of a production system configured as described above will be described.

<3-1. Creation of Causal Relationship Model>

Figure 5:
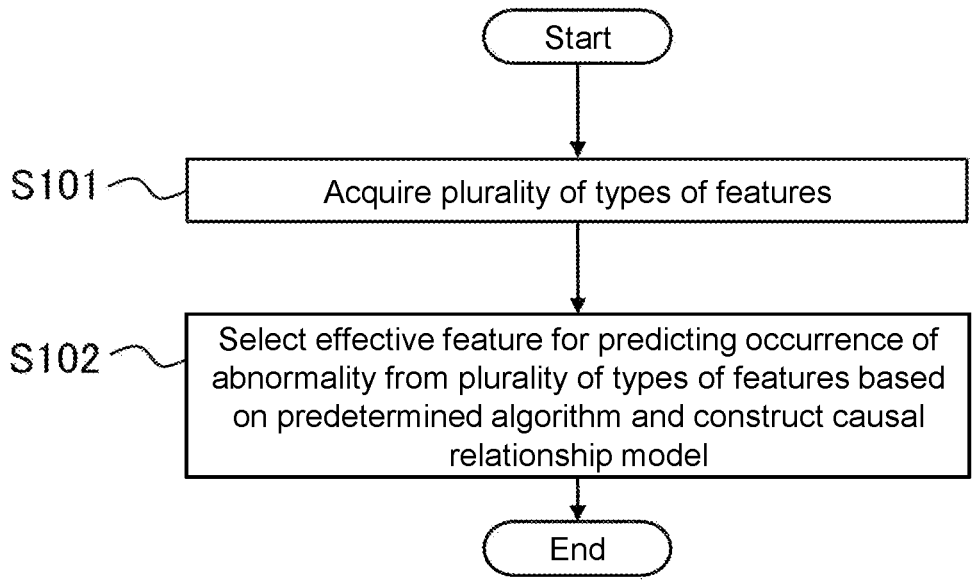
FIG. 5 is a flowchart showing an example of construction of a causal relationship model.

First, a process procedure for the analysis device to create a causal relationship model will be described using FIG. 5. FIG. 5 shows an example of a process procedure for the analysis device to create a causal relationship model.

(Step S101)

In first step S101, the control unit 11 of the analysis device 1 functions as the feature acquisition part 111 and acquires values of a plurality of feature types calculated from the operation state data 124 indicating an operation state of the packaging machine 3 for each of a time of normality in which the packaging machine 3 forms the packaged material WB normally and a time of abnormality in which an abnormality occurs in the formed packaged material WB.

Specifically, first, the control unit 11 collects the operation state data 124 for the divided times of normality and abnormality. Although a type of the operation state data 124 to be collected is not particularly limited as long as it is data indicating a state of the packaging machine 3, data that can be acquired in drive of each mechanism described above, for example, measured data such as torque, speed, acceleration, temperature, pressure, or the like is employed in the present embodiment.

If a mechanism is a sensor, measured data such as an ON time, an OFF time, a turn-on time, a turn-off time, or the like can be employed as the operation state data 124. An ON time and an OFF time are a total time in which a control signal indicates ON or OFF in a target frame as will be described in FIG. 6 below, and a turn-on time and a turn-off time are a time taken for a control signal to turn on or off for the first time in a target frame. In addition, the control unit 11 can acquire detection data indicating whether there is content WA with "ON" or "OFF" as a detection result of each sensor, for example, as the operation state data 124. Further, the collected operation state data 124 may be accumulated in the storage unit 12 or in an external storage device.

Next, the control unit 11 divides the collected operation state data 124 into frames to define a processing range to calculate a feature. For example, the control unit 11 may divide the operation state data 124 into frames for each fixed time length. However, the packaging machine 3 does not necessarily operate at fixed time intervals. Thus, if the operation state data 124 is divided for each frame of a fixed time length, it is likely that an operation of the packaging machine 3 reflected in each frame deviates.

Thus, the control unit 11 divides the operation state data 124 into frames for each takt time in the present embodiment. A takt time is a time taken to produce a prescribed number of products, that is, a time taken to form a prescribed number of packaged materials WB. The takt time can be specified based on a signal to control the packaging machine 3, for example, a control signal to control an operation of each servo motor of the packaging machine 3, or the like.

Figure 6:
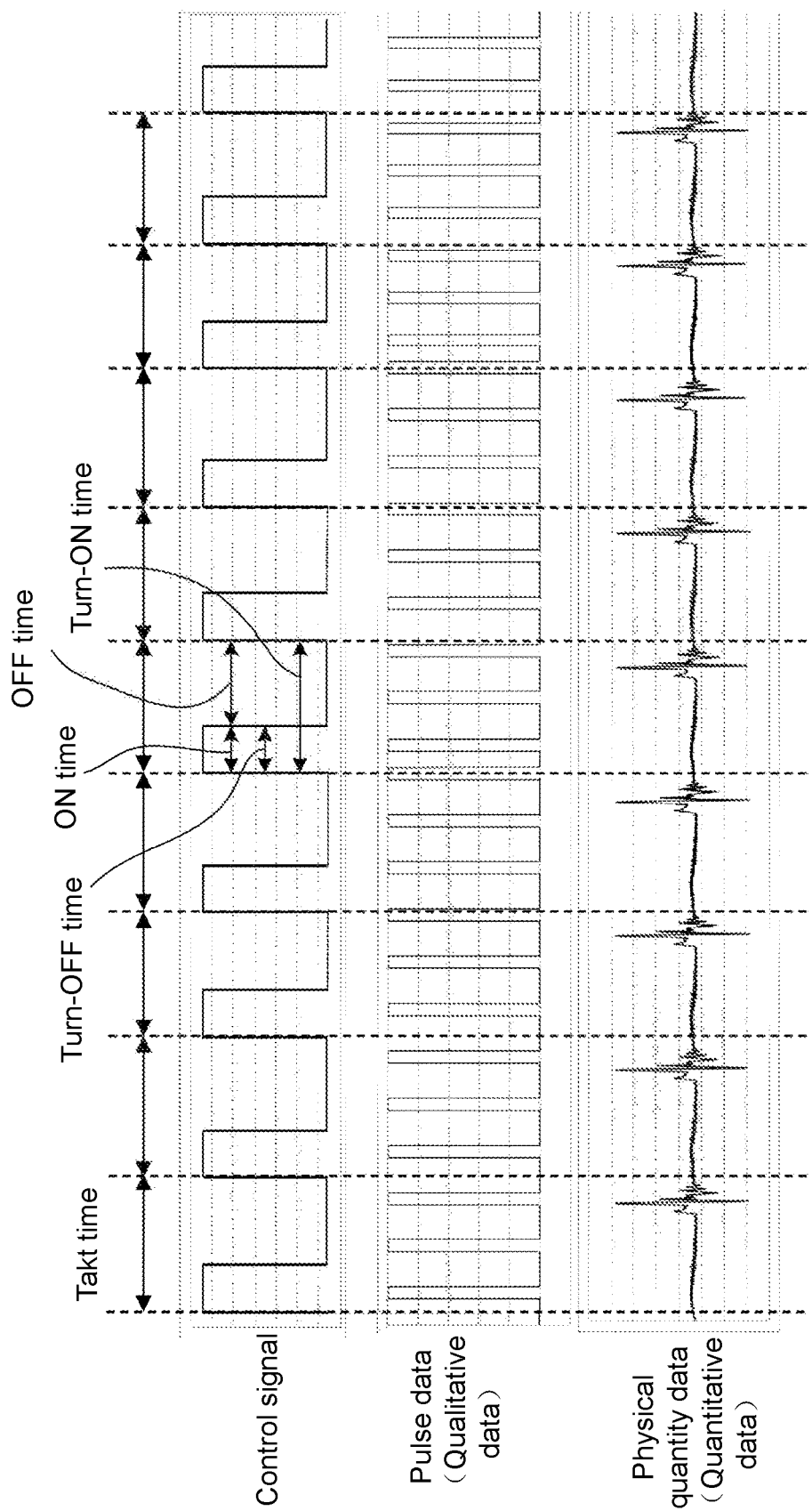
FIG. 6 illustrates an example of a relationship between a control signal and takt times.

An example of a relationship between a control signal and takt times will be described using FIG. 6. FIG. 6 schematically illustrates an example of a relationship between a control signal and takt times. A control signal for production equipment that repeats production of products such as the packaging machine 3 is a pulse signal that periodically indicate "ON" and "OFF" in accordance with production of a prescribed number of products, as illustrated in FIG. 6.

The control signal illustrated in FIG. 6 indicates, for example, "ON" and "OFF" one time each while one package WB is formed. Thus, the control unit 11 can acquire the control signal from the packaging machine 3 and set a time from a rise ("ON") of the acquired signal to the next rise ("ON") thereof as a takt time. In addition, the control unit 11 can divide the operation state data 124 into frames for each takt time, as illustrated in FIG. 6.

Further, a type of control signal may not be particularly limited as long as it is a signal that can be used to control the packaging machine 3. For example, in a case in which the packaging machine 3 includes a sensor for detecting a mark attached to a packaging film and an output signal of the sensor is used to adjust a feeding amount of the packaging film, the output signal of the sensor may be used as a control signal.

Next, the control unit 11 calculates a value of a feature from each frame of the operation state data 124. A type of feature may not be particularly limited as long as it indicates a characteristic of the production equipment.

In a case in which the operation state data 124 is quantitative data such as the measured data (physical quantity data of FIG. 6), for example, the control unit 11 may calculate an in-frame amplitude, a maximum value, a minimum value, a mean value, a variance value, a standard deviation, an autocorrelation coefficient, a maximum value, skewness, or kurtosis of a power spectrum obtained by a Fourier transform, or the like as a feature.

In addition, in a case in which the operation state data 124 is quality data such as the above-described detection data (the pulse data of FIG. 6) for example, the control unit 11 may calculate an "ON" time, an "OFF" time, a duty ratio, the number of "ON" times, the number of "OFF" times, or the like of each frame as a feature.

Furthermore, a feature may be derived not only from a single piece of the operation state data 124 but also a plurality of pieces of the operation state data 124. The control unit 11 may calculate, for example, a mutual correlation coefficient, a ratio, a difference, an amount of synchronization deviation, a distance, or the like between frames corresponding to two kinds of the operation state data 124 as a feature.

The control unit 11 calculates a plurality of types of features described above from the operation state data 124. Accordingly, the control unit 11 can acquire the values of a plurality of types of features calculated from the operation state data 124 for each of a time of normality and a time of abnormality. Further, a process from the collection of the operation state data 124 to the calculation of the values of the features may be performed by the packaging machine 3 or various devices that control the packaging machine, rather than the analysis device 1. In addition, the control unit 11 discretizes the values of the types of the features such that, for example, a state in which each value is higher than a threshold value is set to "1" or "high" and a state in which it is lower than the threshold value is set to "0" or "low."

(Step S102)

In the next step S102, the control unit 11 functions as the model construction part 112 and selects an effective feature for predicting an abnormality from a plurality of acquired types of features based on a prescribed algorithm with which a degree of relationship between each type of feature and an abnormality that occurs in the formed packaged material WB is identified from the value of each type of feature acquired in step S101 for each of the times of normality and abnormality.

The prescribed algorithm may be configured using, for example, a Bayesian network. The Bayesian network is one kind of graphical modeling for expressing a causal relationship between a plurality of random variables with a directed acyclic graph structure and expressing the causal relationship between the random variables with a conditional probability.

The control unit 11 can process each acquired feature and a state of the package WB as a random variable, that is, can set each acquired feature and a state of the package WB as each node, construct a Bayesian network, and thereby derive a causal relationship between the feature and the state of the package WB. A known method may be used to construct the Bayesian network. To construct the Bayesian network, a structural learning algorithm, for example, a greedy search algorithm, a stingy search algorithm, a full search method, or the like can be used. In addition, the Akaike's information criterion (AIC), C4. 5, Cooper-Herskovits measure (CHM), minimum description length (MDL), maximum likelihood (ML), or the like can be used as an evaluation criterion for the constructed Bayesian network. In addition, a pairwise method, a wristwise method, or the like can be used as a processing method when a missing value is included in learning data (operation state data 124) to be used to construct the Bayesian network.

Figure 7A:
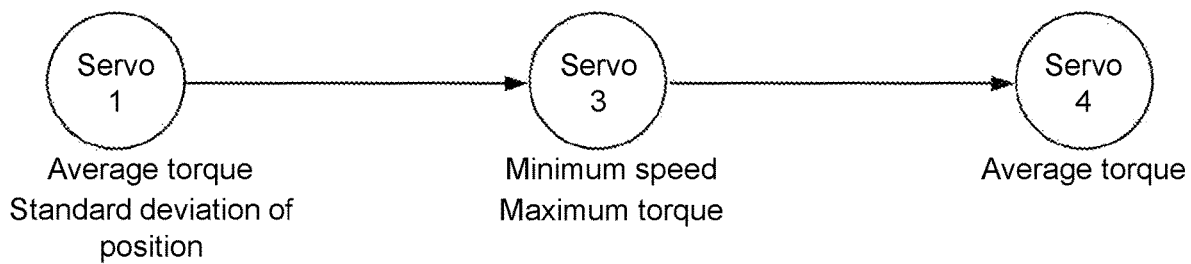
FIG. 7A illustrates an example of the causal relationship model.

For example, FIG. 7A illustrates a causal relationship model when wear of a leather belt is an abnormal event. That is, a causal relationship model in which an average torque and a standard deviation of position which are features of the servo 1 affect an average speed and a maximum torque which are features of the servo 2 and further affect an average torque of the servo 4 is constructed.

Figure 7B:
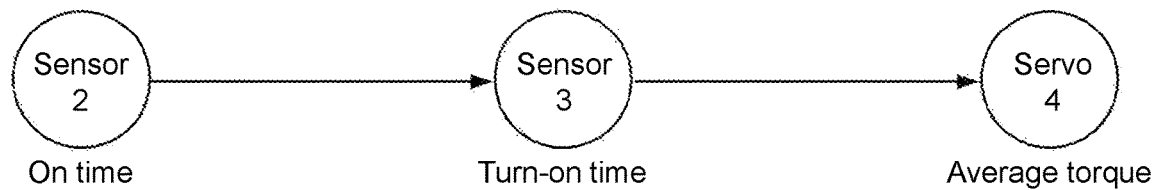
FIG. 7B illustrates an example of the causal relationship model.

FIG. 7B illustrates a causal relationship model when a loose chain of the conveyor 321 of the content transport part 32 is an abnormal event. That is, a causal relationship model in which an ON time which is a feature of the sensor 2 affects a turn-on time which is a feature of the sensor 3 and further affects an average torque of the servo 4 is constructed.

Figure 7C:
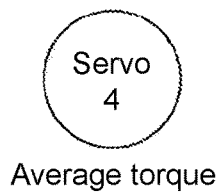
FIG. 7C illustrates an example of the causal relationship model.

FIG. 7C illustrates a causal relationship model when poor sealing of the packaging film is an abnormal event. For this abnormal event, a causal relationship model in which only an average torque of the servo 4 is the cause is constructed. The causal relationship model constructed as described above is stored in the storage unit 12 as the causal relationship model data 123.

Further, a method for processing each acquired feature and a state of the package WB as random variables can be appropriately set in accordance with an embodiment. A state of the package WB can be regarded as a random variable, for example, by setting an event in which the package WB is normal to "0" and an event in which an abnormality occurs in the package WB to "1" and associating each of the events with a probability. In addition, a state of each feature can be regarded as a random variable, for example, by setting an event in which a value of each feature is equal to or less than a threshold value to "0" and an event in which a value of each feature exceeds the threshold value to "1" and associating each of the events with a probability. However, the number of state set for each feature may not be limited to two, and may be three or more.

<3-2. Display of Causal Relationship Model>

Figure 8:
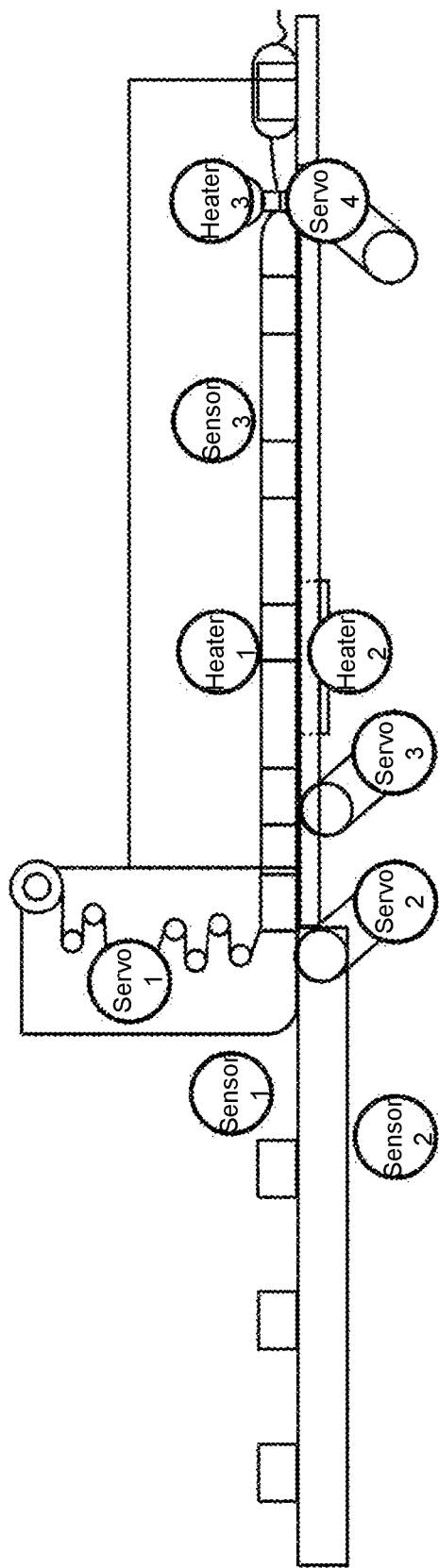
FIG. 8 is a diagram in which nodes of the causal relationship model are overlaid on a schematic diagram of a packaging machine.

Next, display of the causal relationship model constructed as described above will be described. In this case, the control unit 11 of the analysis device 1 functions as the display control part 113. The display control part 113 controls display of the screen 21 as described below. First, the display control part 113 displays the schematic diagram 122 read from the storage unit 12 with the above-described causal relationship model 123 overlaid thereon on the screen 21 of the display device 2. FIG. 8 is a diagram in which mechanisms that can be causal factors of an abnormal event according to the present embodiment are overlaid on a schematic diagram. Here, the servos 1 to 4, the heaters 1 to 3, and the sensors 1 to 3 that are nodes of the causal relationship model are disposed at the installation positions thereof in the schematic diagram as described above. Then, on the screen 21 of the display device 2 to be described next, a mechanism for which the causal relationship model is constructed is selected as a node from the mechanisms, and an edge indicated by an arrow expressing a causal relationship is displayed as the node in accordance with an abnormal event selected by a user.

Figure 9A:
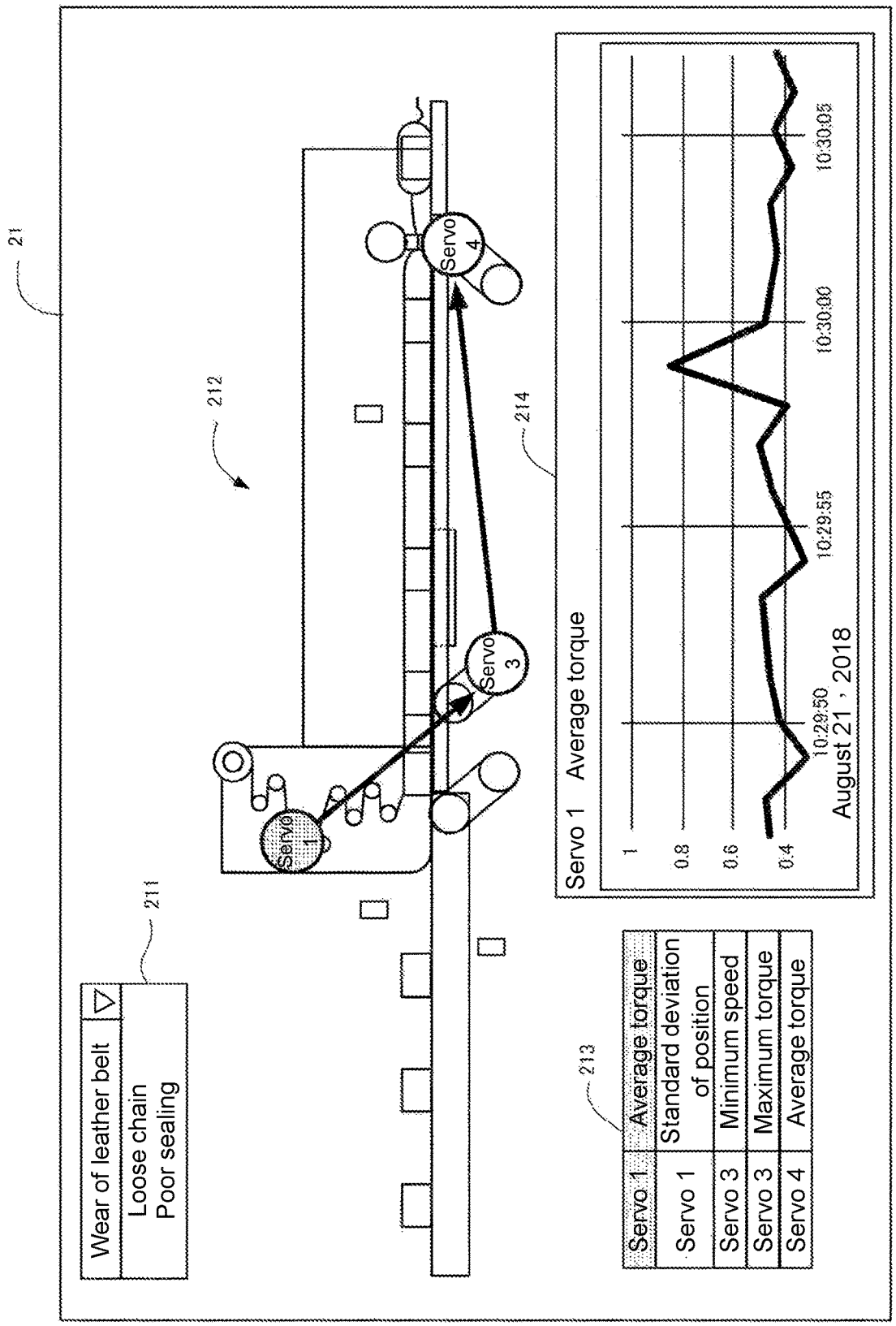
FIG. 9A illustrates an example of a screen of a display device.

FIG. 9A illustrates an example of the screen 21 of the display device 2 showing a causal relationship model. The screen 21 can be operated with the above-described input device 15. A selection box 211 for selecting an abnormal event is displayed at the upper left side of the screen 21 so that an abnormal event can be selected from the pull-down menu. In this example, wear of a leather belt, a loose chain, and poor sealing are shown as abnormal events, and wear of a leather belt is selected from them.

An abnormality cause diagram 212 in which a causal relationship model is overlaid on a schematic diagram of the packaging machine is displayed below the selection box 211. In the example of FIG. 9A, the abnormality cause diagram when wear of the leather belt is an abnormal event is displayed. In addition, a list 213 on which mechanisms that are causal factors and features thereof are shown in accordance with the selected abnormal event is displayed on a lower left side of the abnormality cause diagram 212. A user can select any mechanism and feature from the list 213, and when any one is selected, the mechanism corresponding to that in the abnormality cause diagram 212 is highlighted. In this example, [servo 1: average torque] is selected from the list 213, and thus the servo 1 is highlighted in the abnormality cause diagram 212. Highlight can be made in various methods, and made by means of coloring, blinking, or the like so that the factor can be displayed and distinguished from other nodes.

Furthermore, changes over time in the selected feature are displayed in a graph 214 on the right side of the list 213. In this example, [servo 1: average torque] is selected, and thus the line graph 214 showing changes over time in the feature is displayed.

Figure 9B:
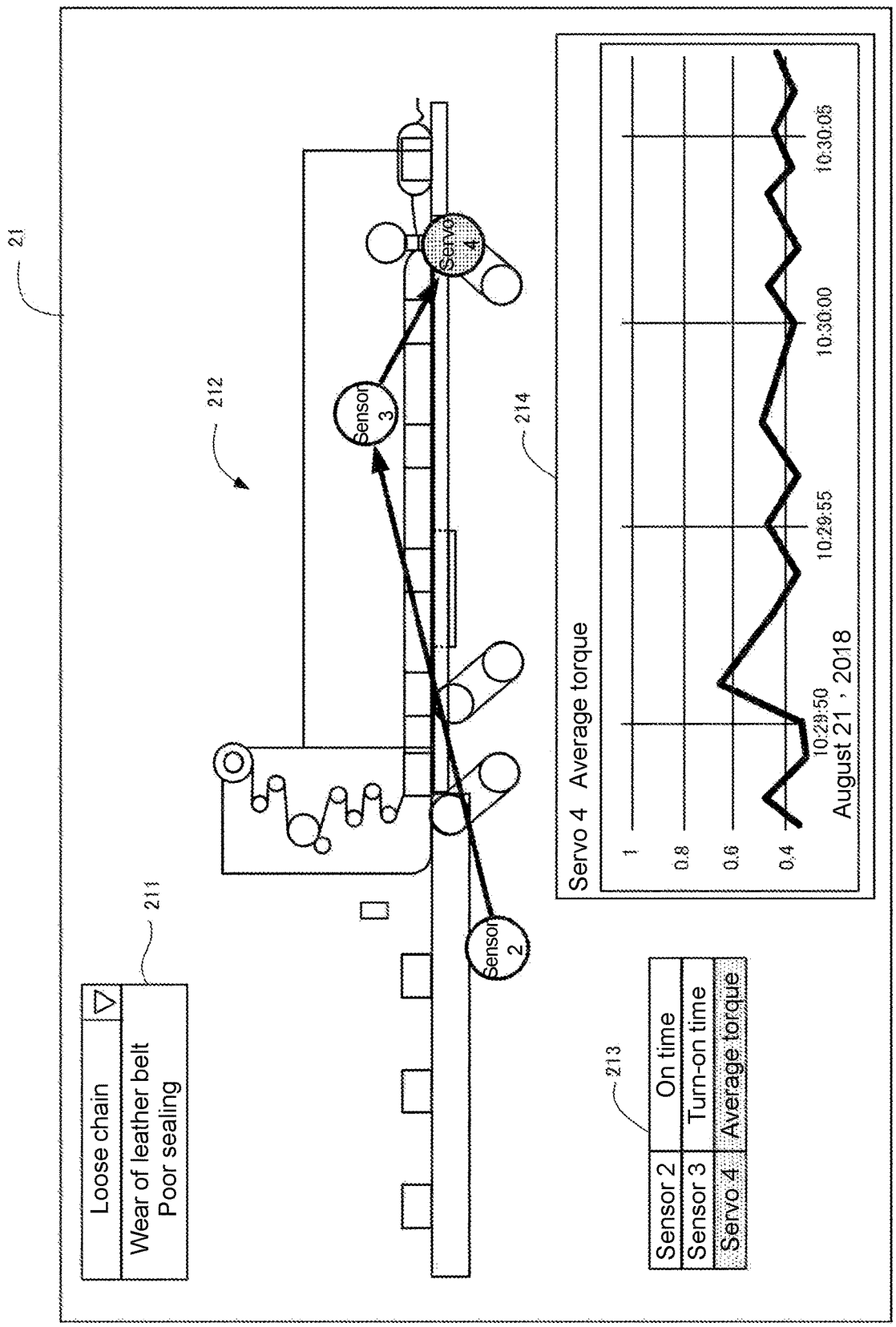
FIG. 9B illustrates an example of the screen of the display device.

FIG. 9B illustrates an example in which the loose chain is displayed as an abnormal event in the box 211. Thus, the mechanism that is the causal factor of the loose chain and a feature are displayed on the list 213. Here, [servo 4: average torque] is selected, thus the servo 4 is highlighted in the abnormality cause diagram 212, and the line graph 214 showing changes over time in [servo 4: average torque] is displayed.

Figure 9C:
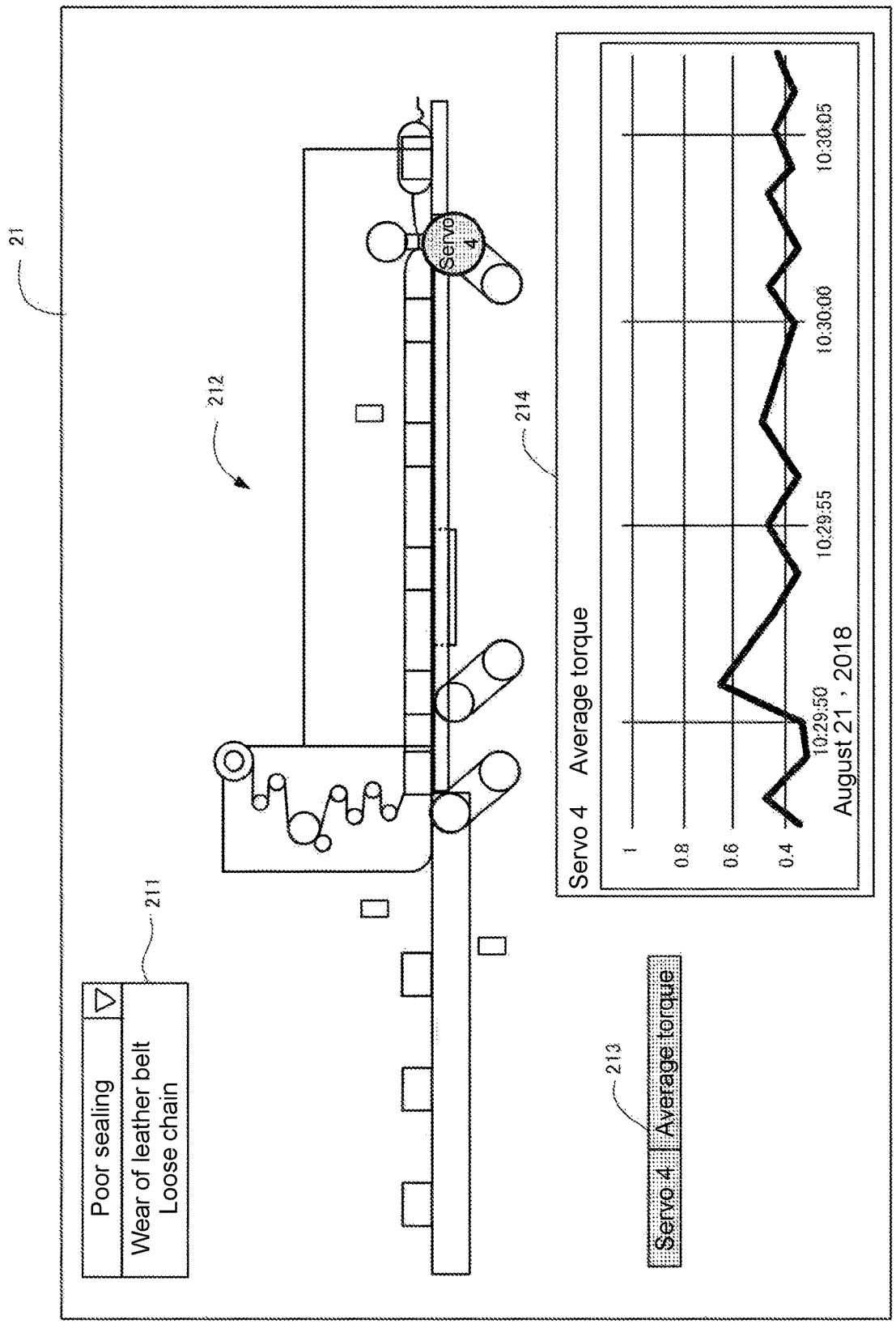
FIG. 9C illustrates an example of the screen of the display device.

FIG. 9C illustrates an example in which poor sealing is displayed as an abnormal event in the box 211. Thus, the mechanism that is the causal factor of the poor sealing and a feature are displayed on the list 213. Here, [servo 4: average torque] is selected, thus the servo 4 is highlighted in the abnormality cause diagram, and the line graph 214 showing changes over time in [servo 4: average torque] is displayed.

The summary of the operation of the screen 21 is as follows. First, a user selects an abnormal event that needs to be checked from the selection box 211 with the input device 15. Then, the display control part 113 displays the abnormality cause diagram 212 corresponding to the selected abnormal event and the list 213 on the screen. Then, when any feature is selected from the list 213, the corresponding node of the abnormality cause diagram 212 is highlighted, and the graph 214 showing changes over time in the selected feature is displayed. Thus, the user can visually recognize the causal relationship related to the abnormal event while viewing the screen 21. Further, the user can appropriately set a time at which the feature changes over time displayed in the graph 214.

<3-3. Change in Causal Relationship Model>

Figure 10:
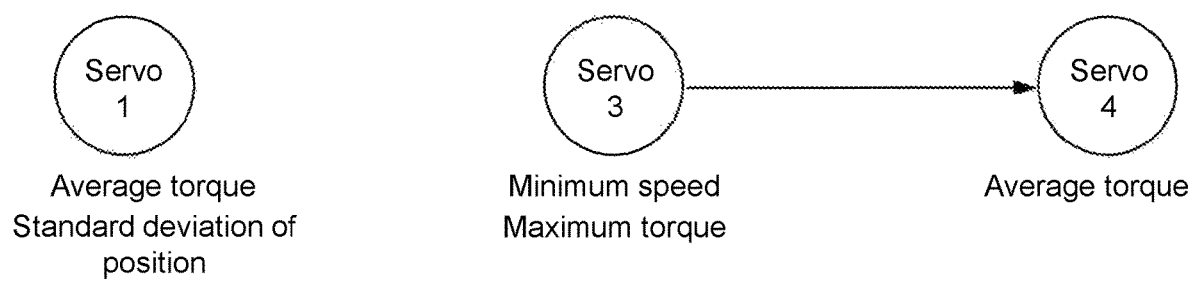
FIG. 10 illustrates an example of a causal relationship model constructed at a different time from FIG. 7A.

Next, a change in a causal relationship model will be described. A causal relationship model constructed as described above is likely to change over time if the packaging machine is driven for a long time. Thus, a causal relationship model is preferably constructed at prescribed time intervals. For example, when a causal relationship model for wear of the leather belt as illustrated in FIG. 7A is constructed at a certain time T1 and a causal relationship model for wear of the leather belt is constructed at a time T2 after the elapse of the prescribed time from the time T1, a causal relationship model as illustrated in FIG. 10 is assumed to be constructed. This means that, although the servos 1, 3, and 4 are causal factors of the wear of the leather belt at the time T1, the servo 1 is no longer a causal factor due to changes over time. That is, at the time T2, the minimum speed and the maximum torque of the servo 3 affect the average torque of the servo 4, which causes the wear of the leather belt.

Figure 11:
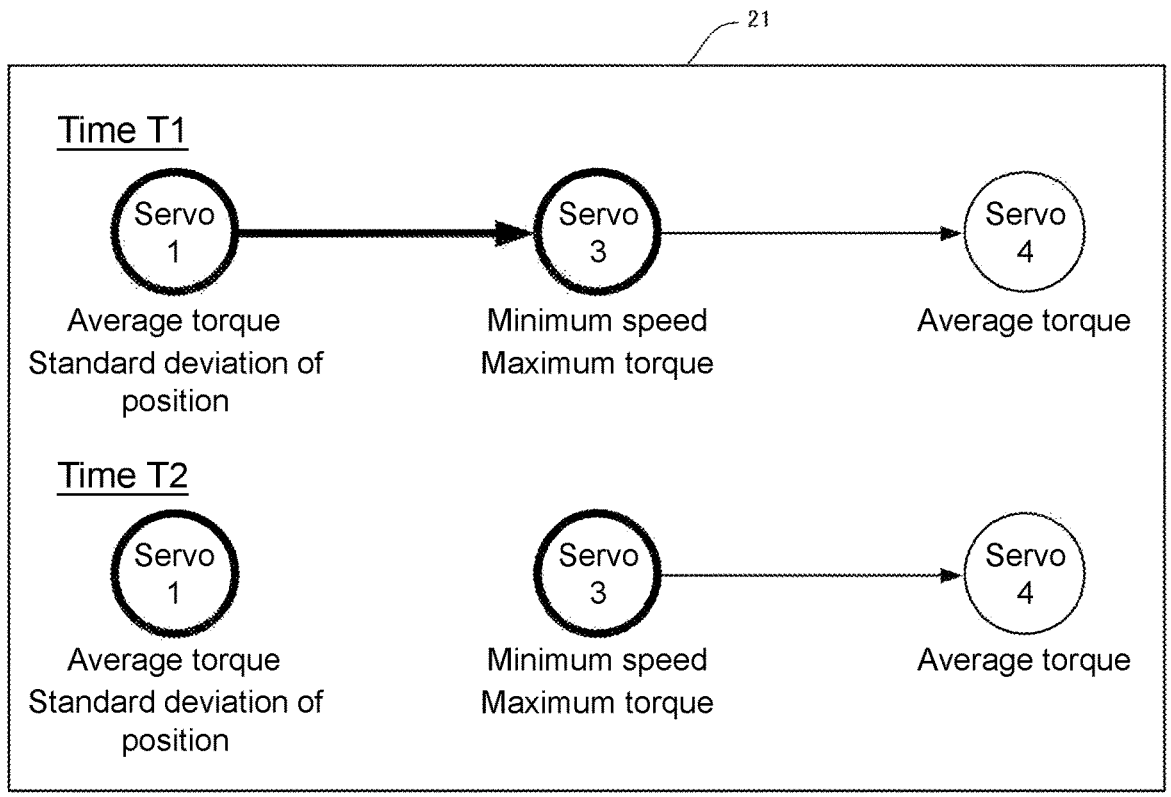
FIG. 11 illustrates an example of a screen on which causal relationship models constructed at a plurality of times are displayed.

Thus, the user needs to know a change in the causal relationship model caused by the changes over time, and thus can perform repair easily when an abnormality occurs. Thus, in a case in which a causal relationship model is constructed at prescribed time intervals and has a change in the present embodiment, the change is displayed on the screen in the present embodiment. FIG. 11 illustrates an example of display on the screen. As illustrated in FIG. 11, causal relationship models for the time T1 and the time T2 are displayed side by side on the screen. In addition, a difference in the two causal relationship models is highlighted. That is, the causal relationship between the servo 1 and the servo 3 has disappeared at the time T2, and thus the servos 1 and 3 and the edge between them are indicated by thick lines in the two causal relationship models. However, a method for highlighting is not particularly limited, and various methods such as coloring and blinking may be applied.

Figure 12A:
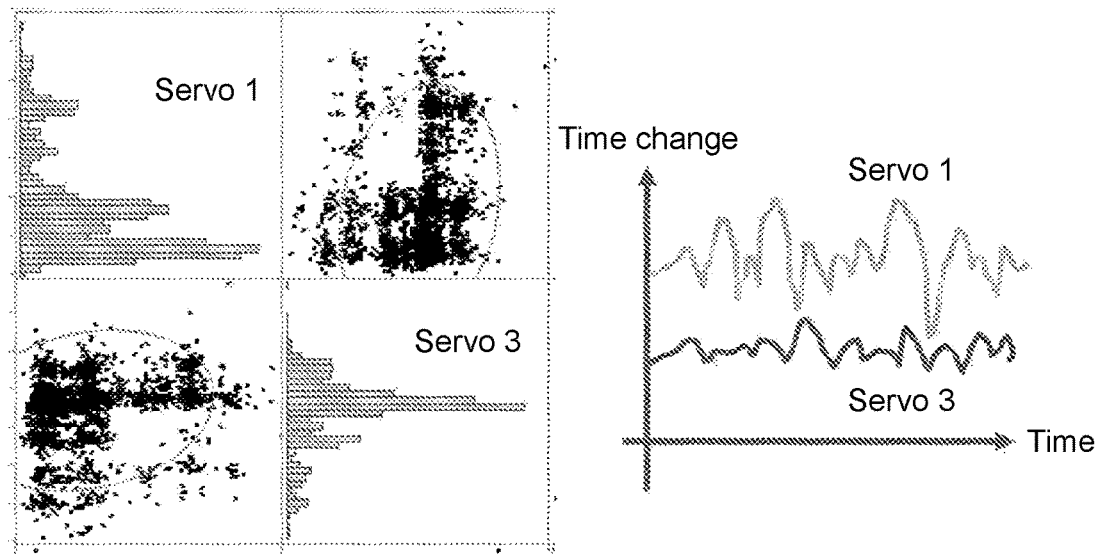
FIG. 12A is a diagram illustrating details of features of the causal relationship model constructed at a time T1.
Figure 12B:
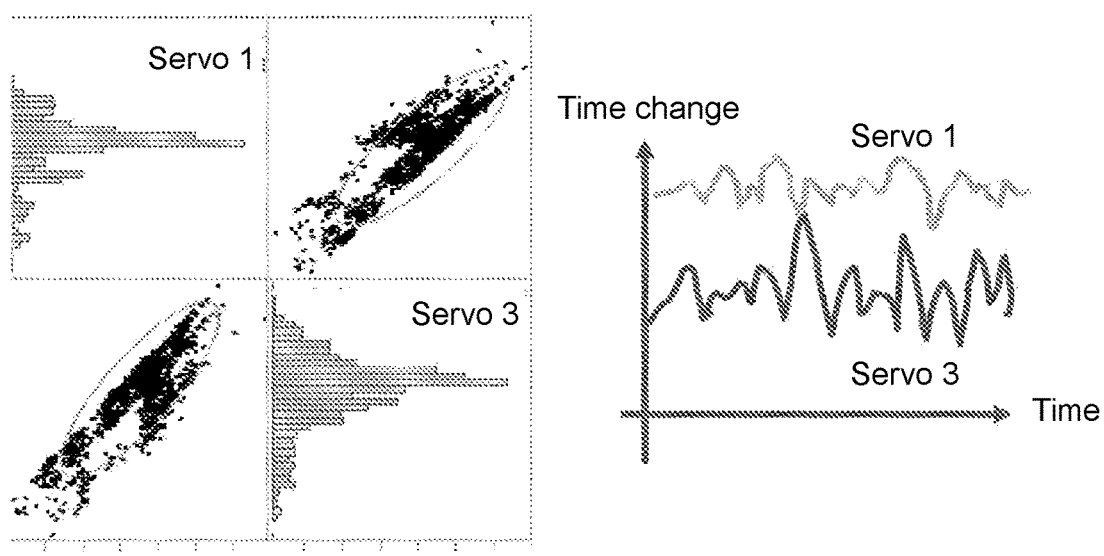
FIG. 12B is a diagram illustrating details of features of the causal relationship model constructed at a time T2.

In addition, FIG. 12A illustrates a frequency distribution, correlation, changes over time of one feature of the servo 1 and the servo 3 at the time T1, and FIG. 12B illustrates a frequency distribution, correlation, changes over time of one feature of the servo 1 and the servo 3 at the time T2. By displaying each of the features on the screen 21 individually, it is possible to examine in detail why the causal relationship model has changed. Further, the data for the features illustrated in FIG. 12A and FIG. 12B is merely an example, and another type of index can also be used.

The analysis device 1 can display, on the display device 2, a change in such a causal relationship model when there is a change as described above, or a causal relationship model can be displayed periodically with a user's own operation. In addition, when there is a change, a display of sound, light, or the like can be used for notification of the change.

4. Features (1) According to the present embodiment, causal relationship models are constructed at a plurality of times and displayed. Thus, the causal relationship models constructed at the plurality of times can be compared. Accordingly, for example, when there is a change in the causal relationship models at the plurality of times, it is possible to know what kind of change has been made over time in a causal factor of an abnormality, and thus the cause of the abnormality can be easily identified by checking a difference between the causal relationship models. In addition, the difference between the causal relationship models can be visually recognized with ease by highlighting the difference.

(2) If the plurality of causal relationship models is known as described above, for example, it is possible to compare the causal relationships between a plurality of packaging machines 3 over the plurality of times. Thus, the plurality of packaging machines 3 can be easily adjusted.

(3) According to the present embodiment, the schematic diagram of the packaging machine 3, the causal relationship model with respect to an abnormality that can occur in the packaging machine 3 are displayed the screen 21 of the display device 2. At this time, the causal relationship model is overlaid to correspond to the schematic diagram and displayed on the screen 21, and thus the causal factor included in the causal relationship model can be identified while viewing the schematic diagram. Thus, it is possible to visually recognize the part of the packaging machine 3 in which the abnormality has occurred.

(4) Because the causal factor and the feature corresponding thereto for each abnormal event are displayed as the list 213 on the screen 21, the causal factor for resolving the abnormality and the feature to control the causal factor can be visually recognized. Controllable features may differ depending on abnormalities even for the same causal factor, for example, and thus it is easy to know which is a controllable feature by viewing the list 213.

5. Modified Examples

Although the embodiment of the present invention has been described in detail, the above description is merely an example of the present invention in every respect. It is needless to say that various improvements and modifications can be performed without departing from the scope of the present invention. For example, the following changes can be made. Further, the same reference numerals are used for constituent elements similar to those of the above-described embodiment below, and description of similar points to those of the above-described embodiment is appropriately omitted. The following modified examples can be appropriately combined.

<5-1>

A method for displaying a plurality of causal relationship models on the screen 21 is not particularly limited, and a method for lining up causal relationship models or the like is not particularly limited. For example, highlighting a difference is not necessary, and causal relationship models can be simply lined up and displayed. In addition, causal relationship models of three or more times can be displayed, and detailed data such as frequency distribution of each feature can be displayed together. Furthermore, they can be displayed together on the screen 21 as illustrated in FIGS. 9A to 9C.

<5-2>

Although the selection box 211 for abnormality events, the abnormality cause diagram 212, the list 213, and the graph 214 are displayed on the screen 21 as illustrated in FIGS. 9A to 9C, the invention is not limited thereto, and some of them may be displayed. A case in which there is one abnormal event is assumable depending on target production equipment, for example, and thus the selection box 211 is not necessary in such a case. In addition, it is not necessary to display all of the elements 211 to 214 on the screen 21, and these may be separately displayed on a plurality of screens to allow a user to switch them.

<5-3>

The construction of the causal relationship model introduced in the above-described embodiment is an example, and another method may be applied. In addition, the schematic diagram data 122 and the causal relationship model data 123 constructed by another device can be sequentially stored in the storage unit 12.

<5-4>

The invention can also be applied to production equipment other than the packaging machine 3, and in this case, a mechanism for constructing a causal relationship model can also be appropriately selected in accordance with the production equipment. In addition, schematic diagram data related to a plurality of pieces of production equipment can be stored in the storage unit 12 and displayed by the display device 2 for each corresponding piece of production equipment.

<5-5>

The display system according to the present invention can be constituted by the analysis device 1 and the display device 2 in the production system. Thus, the display device 2 of the above-described embodiment corresponds to the display unit of the present invention, and the control unit 11 and the storage unit 12 of the analysis device 1 corresponds to the control unit and the storage unit of the present invention. The control unit, the storage unit, and the display unit of the present invention can be configured by tablet PCs, and the like.

What is claimed is:

1. A display system provided in production equipment that produces a product and has at least one driving means for driving the production equipment and at least one monitoring means for monitoring the production, in which the driving means and the monitoring means have at least one controllable feature, the display system comprising:
a control unit;
a display unit; and
a storage unit,
wherein the control unit
obtains the feature output over time from at least one among the driving means and the monitoring means and causes the storage unit to store the feature,
constructs, at each prescribed time, a causal relationship model that indicates at least one causal factor that is selected from the driving means and the monitoring means for at least one abnormality that can occur in the production equipment and a relationship between the causal factors based on the obtained feature, wherein the control unit is configured to construct a first causal relationship model at a first prescribed time and to construct a second causal relationship model at a second prescribed time after an elapse of a prescribed time interval from the first prescribed time; and
displays, on the display unit, a plurality of the causal relationship models constructed at a plurality of the times by displaying side by side the first causal relationship model constructed at the first prescribed time and the second causal relationship model constructed at the second prescribed time.

2. The display system according to claim 1, wherein the control unit highlights a difference between the plurality of causal relationship models and displays the difference on the display unit.

3. The display system according to claim 1, wherein the control unit displays, on the display unit, a change in the feature of the causal factor over time in each of the causal relationship models.

4. The display system according to claim 1, further comprising:
a notification unit that gives a notification when there is a difference between the plurality of causal relationship models constructed at the plurality of times.

5. A display method for displaying, on a display unit, a causal relationship of an abnormality that can occur in production equipment that produces a product and has at least one driving means for driving the production equipment and at least one monitoring means for monitoring the production, the display method comprising:
obtaining a feature output over time from at least one among the driving means and the monitoring means;
constructing, at each prescribed time, a causal relationship model that indicates at least one causal factor that is selected from the driving means and the monitoring means for at least one abnormality that can occur in the production equipment and a relationship between the causal factors based on the obtained feature, wherein a first causal relationship model is constructed at a first prescribed time and a second causal relationship model is constructed at a second prescribed time after an elapse of a prescribed time interval from the first prescribed time; and displaying, on the display unit, a plurality of the causal relationship models constructed at a plurality of the times by displaying side by side the first causal relationship model constructed at the first prescribed time and the second causal relationship model constructed at the second prescribed time.

6. A non-transitory computer-readable recording medium, recording a display program for displaying, on a display unit, a causal relationship of an abnormality that can occur in production equipment that produces a product and has at least one driving means for driving the production equipment and at least one monitoring means for monitoring the production, the display program causing a computer to execute:

obtaining a feature output over time from at least one among the driving means and the monitoring means;

constructing, at each prescribed time, a causal relationship model that indicates at least one causal factor that is selected from the driving means and the monitoring means for at least one abnormality that can occur in the production equipment and a relationship between the causal factors based on the obtained feature, wherein a first causal relationship model is constructed at a first prescribed time and a second causal relationship model is constructed at a second prescribed time after an elapse of a prescribed time interval from the first prescribed time; and displaying, on the display unit, a plurality of the causal relationship models constructed at a plurality of the times by displaying side by side the first causal relationship model constructed at the first prescribed time and the second causal relationship model constructed at the second prescribed time.

* * * * *